United States Patent
Huang et al.

(10) Patent No.: US 7,625,122 B2
(45) Date of Patent: *Dec. 1, 2009

(54) FLUID DYNAMIC BEARING

(75) Inventors: Ching-Hsing Huang, Tu-Cheng (TW);
Wun-Chang Shih, Tu-Cheng (TW);
Hsien-Sheng Pei, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 773 days.

This patent is subject to a terminal disclaimer.

(21) Appl. No.: 11/012,420

(22) Filed: Dec. 14, 2004

(65) Prior Publication Data
US 2006/0034554 A1 Feb. 16, 2006

(30) Foreign Application Priority Data
Aug. 14, 2004 (CN) .................. 2004 1 0051160

(51) Int. Cl.
*F16C 32/06* (2006.01)
(52) U.S. Cl. .................. 384/100; 384/107; 384/114; 384/112
(58) Field of Classification Search .................. 384/100, 384/107, 112, 113, 114, 120, 121, 123, 291, 384/292
See application file for complete search history.

(56) References Cited

U.S. PATENT DOCUMENTS

| | | | |
|---|---|---|---|
| 3,870,382 A * | 3/1975 | Reinhoudt | 384/123 |
| 4,961,122 A * | 10/1990 | Sakai et al. | 360/271.3 |
| 5,407,281 A | 4/1995 | Chen | |
| 5,415,476 A | 5/1995 | Onishi | |
| 5,427,456 A | 6/1995 | Hensel | |
| 5,504,637 A * | 4/1996 | Asada et al. | 360/98.07 |
| 5,795,074 A | 8/1998 | Rahman et al. | |
| 5,810,480 A | 9/1998 | Asada et al. | |
| 5,906,440 A | 5/1999 | Yoshitsugu et al. | |
| 5,908,247 A | 6/1999 | Leuthold et al. | |
| 6,017,150 A | 1/2000 | Lee | |
| 6,124,657 A * | 9/2000 | Yamashita et al. | 310/90 |
| 6,276,831 B1 | 8/2001 | Takahashi et al. | |
| 6,296,391 B1 | 10/2001 | Hayakawa et al. | |
| 6,626,577 B1 * | 9/2003 | Horng et al. | 384/292 |
| 6,760,187 B2 * | 7/2004 | Asada et al. | 360/99.08 |
| 7,229,214 B2 * | 6/2007 | Huang et al. | 384/115 |

* cited by examiner

*Primary Examiner*—Thomas R Hannon
*Assistant Examiner*—Justin Krause
(74) *Attorney, Agent, or Firm*—Frank R. Niranjan

(57) ABSTRACT

A fluid dynamic bearing includes a bearing member (30) axially defining an inner bearing hole therein, and a spindle shaft (20) rotatably received in the bearing hole with a bearing clearance formed between an inner periphery of the bearing member and an outer periphery of the spindle shaft. Lubricant is filled in the bearing clearance. One of the inner periphery and the outer periphery comprises a bearing surface (10) with channels formed therein. The channels form a plurality of outer communication ends (1316*b*) at opposite sides of the bearing surface in the axial direction of the bearing member.

5 Claims, 2 Drawing Sheets

FLUID DYNAMIC BEARING

TECHNICAL FIELD

The present invention relates generally to bearings, and more particularly to a fluid dynamic bearing.

BACKGROUND

Due to request for low abrasion on rotational elements to achieve an extended life and for low extent of noise, fluid dynamic bearings (FDB) have been used in conventional fan motors and hard disk drive motors.

In a typical FDB, a shaft is pivotably inserted into a bearing sleeve with a bearing clearance formed therebetween. Pressure-generating grooves are formed on either the outer peripheral surface of the shaft or the inner peripheral surface of the bearing sleeve. The bearing clearance is filled with lubricant oil that provides a medium through which a dynamic fluid pressure field is generated upon relative rotation between the bearing sleeve and the shaft. During normal operation, the spinning of the shaft sets up a steady pressure field around the bearing clearance that separates the shaft and the bearing sleeve and thus prevents metal-to-metal contact.

FIG. 4 shows a dynamic pressure-generating groove pattern of a so called "herringbone" type. Each groove is V-shaped and has two branches 87a, 87b having a common intercrossing area 88. Suppose a top side of the groove pattern faces outside, so the lubricant oil in the groove at the top side exposes to atmosphere. Sealing measures must be taken to prevent leakage of the lubricant oil at the top side. When the shaft rotates, the lubricating oil is driven from ends of the branches 87a, 87b to the intercrossing area 88 to generate a high pressure. At the same time, because a part of the lubricating oil is moved to the intercrossing area 88, the lubricating oil remaining near the ends of the branches 87a, 87b generates a very low pressure. This low pressure is required to be even lower than the outside atmosphere pressure so that the lubricant oil at the top edge does not flow outside. However, if the lower pressure generated by the lubricating oil at the top edge is very close to the outside atmosphere pressure, the lubricating oil is still possible to leakage, when the motor is subject to vibration during use or the motor is used in a location where the outside atmosphere pressure is lowered. Therefore, the lower pressure generated by the lubricating oil at the top edge is desired to be low enough.

For the foregoing reasons, there is a need for a fluid bearing having an improved capability to prevent leakage of lubricating oil.

SUMMARY OF THE INVENTION

The present invention is directed to a fluid dynamic bearing which has an improved capability to prevent oil leakage.

A fluid dynamic bearing in accordance with the present invention comprises a bearing member axially defining an inner bearing hole therein, and a spindle shaft rotatably received in the bearing hole with a bearing clearance formed between an inner periphery of the bearing member and an outer periphery of the spindle shaft. Lubricant is filled in the bearing clearance. One of the inner periphery and the outer periphery comprises a bearing surface with channels formed therein. The channels form a plurality of outer communication ends at opposite sides of the bearing surface in the axial direction of the bearing member.

Other objects, advantages and novel features of the present invention will be drawn from the following detailed description of the preferred embodiments of the present invention with attached drawings, in which:

DESCRIPTION OF PREFERRED EMBODIMENTS

Figure 1:
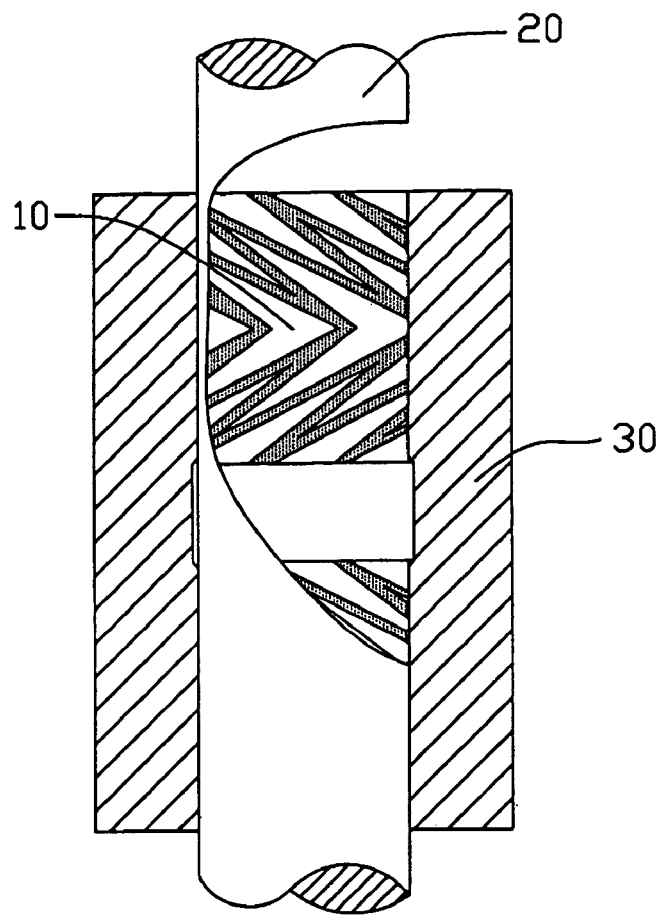
FIG. 1 is a cross sectional view of a fluid dynamic bearing according to a preferred embodiment of the present invention.

FIG. 1 shows by way of example an embodiment of a fluid dynamic bearing. This fluid dynamic bearing is used, for example, in connection with a hard disk drive motor, a fan motor and a scanner motor or the like. The fluid dynamic bearing comprises a bearing sleeve 30, and a spindle shaft 20 rotatably received in the bearing sleeve 30.

The inner peripheral surface of the bearing sleeve 30 is formed with at least one bearing surface 10. The bearing surface 10 of the bearing sleeve 30 is opposed to an outer peripheral surface of the spindle shaft 20, with a bearing clearance defined therebetween. The bearing clearance is filled with fluids like lubricating oil that provides a medium through which a dynamic fluid pressure field is generated upon relative rotation at high speed between the bearing sleeve 30 and the spindle shaft 20. Thus, the bearing sleeve 30 can radially support the spindle shaft 20 in a non-contact manner.

Figure 2:
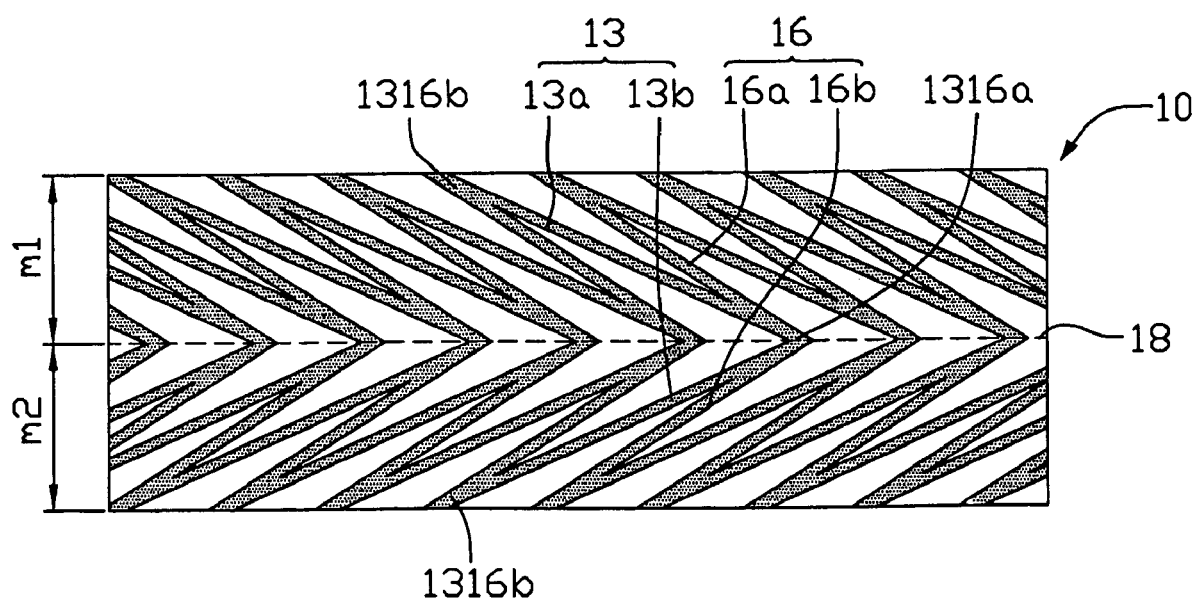
FIG. 2 is an enlarged, unfurled view of the radial bearing surface of the fluid dynamic bearing of FIG. 1.

Referring also to FIG. 2, the bearing surface 10 is shown in an unfurled view. The bearing surface 10 comprises axially continuous first and second regions m1, m2 with a boundary line 18. It should be understood that the first and second regions m1, m2 are in fact cylindrical in a real bearing product.

In the first region m1, a set of parallel first channels 13a and a set of parallel second channels 16a are formed in an alternating manner along extension of the bearing surface 10. The first and second channels 13a, 16a are inclined with respect to an axis of the fluid dynamic bearing. The first and second channels 13a, 16a deviate from the axis of the fluid dynamic bearing with different angles so that any two neighboring first and second channels 13a, 16a either intercross at an upper edge (a top side of the bearing surface 10) of the first region m1 to form an outer communication end 13 16b thereat, or intercross at an lower edge (immediately above boundary line 18) of the first region m1.

In the second region m2, third and fourth channels 13b, 16b are formed in an alternating manner along extension of the bearing surface 10, being symmetrical with the first and second channels 13a, 16a respectively with respect to the boundary line 18. Thus, any two neighboring third and fourth channels 13b, 16b either intercross at an upper edge (immediately below boundary line 18) of the second region m2, or intercross at a lower edge (a bottom side of the bearing surface 10) of the second region m2 to form the outer communication end 1316b.

Since the first and second regions m1, m2 of the bearing surface 10 are axially continuous, the first, second, third and fourth channels 13a, 16a, 13b, 16b collectively communicate with each other at the boundary line 18 to form a plurality of inner communication ends 1316a thereat. As a result, every two symmetrical channels form a V-shaped groove. Specifically, the first channels 13a in the first region m1 and corresponding third channels 13b in the second region m2 form a plurality of first V-shaped grooves 13, and the second channels 16a in the first region m1 and corresponding fourth channels 16b in the second region m2 form a plurality of second V-shaped grooves 16. The first grooves 13 and the second grooves 16 are alternatingly arranged along extension of the bearing surface 10.

When the rotary shaft 20 rotates, the lubricating oil at the outer communication ends 1316b is driven to the inner communication ends 1316a of the first and second grooves 13, 16 under a centrifugal pumping force caused by rotation of the rotary shaft 20. A large amount of lubricating oil at the inner communication ends 1316a then establishes a high fluid pressure to separate the rotary shaft 20 and the bearing sleeve 30 in radial direction.

In the present invention, the first and third channels 13a, 13b of each first grooves 13 are in communication with the second and fourth channels 16a, 16b of one neighboring second groove 16 at the opposite top and bottom sides of the bearing surface 10 in the axis of the bearing sleeve 30, thereby forming the outer communication ends 1316b thereat respectively. The lubricating oil at each outer communication end 1316b is thus driven to a center area of the bearing surface 10 along two separate paths, i.e., the first and second channels 13a, 16a, or 13b, 16b. Therefore, it is easy for more lubricating oil to move to the center area of the bearing surface 10. In other words, the lubricating oil remaining at the outer communication end 1316b becomes less in comparison with the conventional fluid bearing in which only one lubricating oil flow path is arranged. As a result, the pressure generated by the lubricating oil at the opposite sides of the bearing surface 10 becomes further lower than that of the conventional fluid bearing. Suppose the top side of the bearing surface 10 faces an outside of the bearing sleeve 30, this further lower pressure provides an enhanced capability to prevent leakage of lubricating oil at the top side of the bearing surface 10.

In the above-mentioned fluid dynamic bearing, the second region m2 is continuous to the first region m1. Alternatively, the second region m2 is axially spaced from the first region m1. Thus, the first, second, third and fourth channels 13a, 16a, 13b, 16b do not communicate directly with each other at the center area of the bearing surface 10. In stead, an annular recessed region may be formed between the first and second regions m1, m2. The first, second, third and fourth channels 13a, 16a, 13b, 16b all communicate with the recessed region, whereby the lubricating oil can be collected to the recessed region to establish a high fluid pressure field thereat.

In addition, the first and second channels 13a, 16a are not necessary to intercross with each other at the lower edge of the first region m1 of the bearing surface 10, and the third and fourth channels 13b, 16b are not necessary to intercross with each other at the upper edge of the second region m2 of the bearing surface 10.

Figure 3:
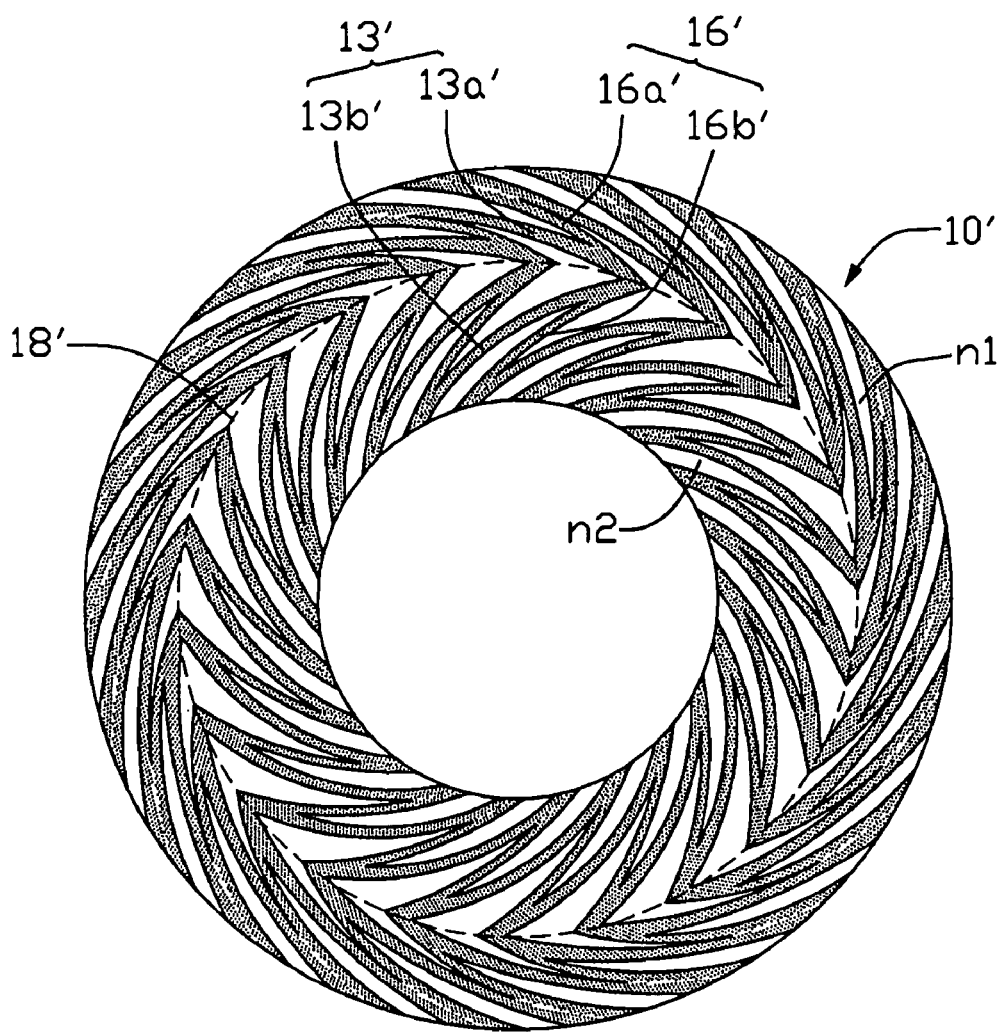
FIG. 3 is a plan view of fluid dynamic bearing of a thrust type according to an alternative embodiment of the present invention.
Figure 4:
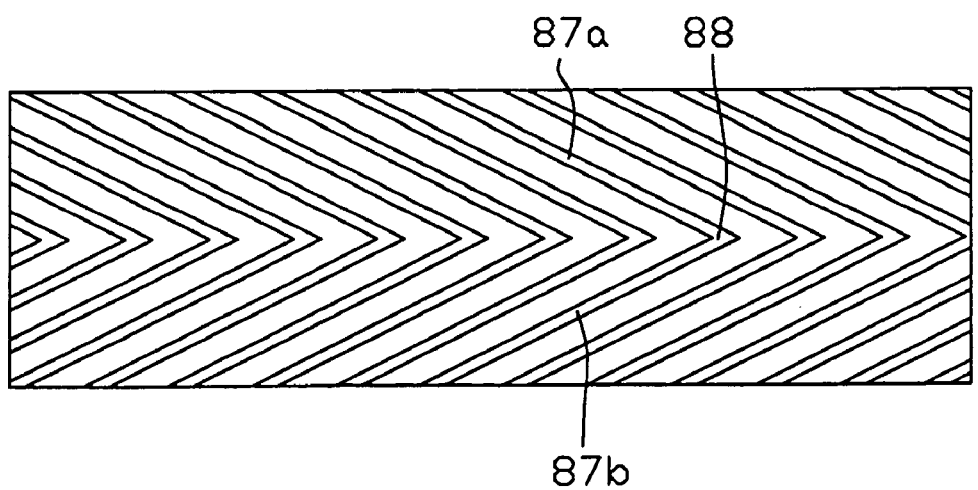
FIG. 4 is an enlarged, unfurled view of a radial bearing surface of a conventional fluid dynamic bearing.

FIG. 3 illustrates by way of example a bearing surface 10' of a thrust fluid dynamic bearing according to an alternative embodiment of the present invention. The bearing surface 10' comprises first and second annular regions n1, n2 with a boundary line 18'. In the first region n1, a plurality of first and second channels 13a', 16a' is formed, intercrossing at an outer edge of the bearing surface 10'. In the second region n2, a plurality of third and fourth channels 13b', 16b' is formed, intercrossing at an inner edge of the bearing surface 10. The first channels 13a' and corresponding third channels 13b' intercross at a center area of the bearing surface 10 around the boundary line 18' to form a plurality of first generally V-shaped grooves 13', and the second channels 16a' and corresponding fourth channels 16b' intercross at the center area of the bearing surface 10' around the boundary line 18' to form a plurality of second generally V-shaped grooves 16.

In the preferred embodiment of the present invention, the bearing surface 10 is formed on the inner periphery of the bearing sleeve 30. Alternatively, the bearing surface may be formed on the outer periphery of the spindle shaft 20.

It is understood that the invention may be embodied in other forms without departing from the spirit thereof. The above-described examples and embodiments are to be considered in all respects as illustrative and not restrictive, and the invention is not to be limited to the details given above.

What is claimed is:

1. A fluid dynamic bearing assembly comprising:
    a bearing member axially defining an inner bearing hole therein extending along an axial direction of the bearing member;
    a spindle shaft rotatably received in the bearing hole with a bearing clearance formed between an inner periphery of the bearing member and an outer periphery of the spindle shaft;
    lubricant filled in the bearing clearance;
    at least one of the inner periphery and the outer periphery forming a bearing surface with channels formed therein; wherein the bearing surface comprises first and second groove regions, and the channels comprises first and second sets of channels alternatingly arranged along a circumferential direction of the first region, and third and fourth sets of channels alternatingly arranged along a circumferential direction of the second region, the channels of each set being parallel to each other while inclined to an axis of the fluid dynamic bearing in an unfurled view of the bearing surface, the first and second sets of channels deviating from the axis of the fluid dynamic bearing with different angles, and the third and fourth sets of channels deviating from the axis of the fluid dynamic bearing with different angles, a length of each first channel being larger than that of each second channel, and a length of each third channel being larger than that of each fourth channel, the channels forming a plurality of outer communication ends at opposite sides of the bearing surface in the axial direction of the bearing member.

2. The fluid dynamic bearing as described in claim 1, wherein the channels further forms a plurality of inner communication ends at a center area of the bearing surface.

3. The fluid dynamic bearing as described in claim 1, wherein each of the first channels and one corresponding third channel form a first V-shaped groove, and each of the second channels and one corresponding fourth channel form a second V-shaped groove, an orientation of the first V-shaped groove being the same as that of the second V-shaped groove.

4. The fluid dynamic bearing as described in claim 3, wherein a first angle defined in the first V-shaped groove between the first channel and the corresponding third channel being smaller than a second angle defined in the second V-shaped groove between the second channel and the corresponding fourth channel.

5. A fluid dynamic bearing comprising a pair of relatively rotatable bearing surfaces, one of the pair of bearing surfaces comprising a plurality of V-shaped grooves used to receive fluid therein, each of the grooves comprising two channels being connected together at a middle of the each of the grooves, and being spaced from each other at two opposite sides of the each of the grooves, the channels of the each of the grooves being connected to the channels of one of two neighboring grooves at the middle of the each of the grooves to form a fluid highest-pressure point during relative rotation of said pair of bearing surfaces, and the channels of the each of the grooves being spaced from the channels of the other one of the two neighboring grooves at the middle of the each of the grooves, wherein the two channels of the each of the grooves are connected to the two channels of the other one of the two neighboring grooves at the two opposite sides of the one of the pair of bearing surfaces, respectively, to form two fluid lowest-pressure joints at the two opposite sides of the each of the grooves, and the two channels of the each of the grooves are spaced from the two channels of the one of the two neighboring grooves at the one of the pair of bearing surfaces, respectively, and wherein the channels of the each of the grooves each have a length being larger than that of each of the channels of each of the two neighboring grooves.

* * * * *

UNITED STATES PATENT AND TRADEMARK OFFICE
CERTIFICATE OF CORRECTION

PATENT NO. : 7,625,122 B2  Page 1 of 1
APPLICATION NO. : 11/012420
DATED : December 1, 2009
INVENTOR(S) : Huang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1023 days.

Signed and Sealed this

Twenty-sixth Day of October, 2010

David J. Kappos
*Director of the United States Patent and Trademark Office*